US008614859B2

(12) United States Patent
Galbiati et al.

(10) Patent No.: US 8,614,859 B2
(45) Date of Patent: Dec. 24, 2013

(54) STOPPING METHOD FOR A SPINDLE MOTOR AND RELATED DEVICE

(75) Inventors: Ezio Galbiati, Agnadello (IT); Frederic Pascal Bonvin, Longmont, CO (US)

(73) Assignees: STMicroelectronics S.r.l., Agrate Brianza (IT); STMicroelectronics, Inc., Carrollton, TX (US)

( * ) Notice: Subject to any disclaimer, the term of this patent is extended or adjusted under 35 U.S.C. 154(b) by 938 days.

(21) Appl. No.: 12/751,740

(22) Filed: Mar. 31, 2010

(65) Prior Publication Data

US 2010/0246051 A1 Sep. 30, 2010

(30) Foreign Application Priority Data

Mar. 31, 2009 (IT) .................. MI2009A0504

(51) Int. Cl.
*G11B 21/02* (2006.01)
(52) U.S. Cl.
USPC ............................................. 360/55
(58) Field of Classification Search
USPC ............................................. 360/55
See application file for complete search history.

(56) References Cited

U.S. PATENT DOCUMENTS

| 4,658,308 | A | 4/1987 | Sander, Jr. |
| 4,786,995 | A | 11/1988 | Stupeck et al. |
| 5,091,680 | A | 2/1992 | Palm |
| 2002/0006007 | A1* | 1/2002 | Ataee ............... 360/73.01 |
| 2006/0072237 | A1* | 4/2006 | Kokami ............... 360/75 |
| 2007/0188906 | A1* | 8/2007 | Ho et al. ............... 360/75 |
| 2008/0303458 | A1 | 12/2008 | Galbiati |

* cited by examiner

*Primary Examiner* — Mark Blouin
(74) *Attorney, Agent, or Firm* — Seed IP Law Group PLLC

(57) ABSTRACT

A method and circuit to stop a spindle motor in the absence of the external supply voltage in which the spindle motor is structured to move a hard disk provided with at least one reading or writing head moved by a voice coil motor, the spindle motor provided with a plurality of coils. The method includes rectifying the backelectromotive force of the spindle motor to produce a braking current, driving the voice coil motor with at least a portion of the braking current until the speed of the spindle motor becomes lower than a predetermined stop speed, and, after the parking of the at least one reading or writing head of the voice coil motor, stopping the spindle motor by short-circuiting the coils of the spindle motor.

18 Claims, 4 Drawing Sheets

STOPPING METHOD FOR A SPINDLE MOTOR AND RELATED DEVICE

BACKGROUND

1. Technical Field

The present disclosure relates to spindle motors and, more particularly, to a method and device for stopping a spindle motor.

2. Description of the Related Art

In the state of the art, it is known that the hard disks of computers and the like are provided with a spindle motor for rotating the hard disk itself and a voice coil motor for moving the reading and writing heads.

In the event of a sudden lack of supply voltage, a procedure is implemented to first park the reading and writing heads, and then to stop the spindle motor once the heads have reached the parked position.

In the absence of supply voltage, the spindle motor serves as a voltage generator, the voltage of which depends on its rotational speed and its electric constant.

FIG. 1 shows the block diagram of a typical power combination used in applications for hard disks. The power combination is used to properly drive the spindle motor 2 and the voice coil motor 3 by a single driving circuit 1, which properly drives the power stage 12 for the spindle motor 2 and the power stage 13 for the voice coil motor 3, as better shown in FIG. 2. The driving circuit 1 includes the driving circuit 10 of the power stage 12 of the spindle motor 2 and the driving circuit 11 of the power stage 13 of the voice coil motor 3. The power stage 12 includes three pairs of transistors M1-M2, M3-M4, M5-M6 with respective pairs of diodes D1-D2, D3-D4, D5-D6 connected in parallel with each other between supply voltage Vm and ground GND, whereas the power stage 13 includes two pairs of transistors M7-M8, M9-M10 with respective pairs of diodes D7-D8, D9-D10 connected in parallel with each other between a supply voltage Vm and ground GND. The spindle motor 2 is coupled to the shared terminals of the pairs of transistors M1-M2, M3-M4, M5-M6, whereas the voice coil motor is coupled to the shared terminals of the pairs of transistors M7-M8, M9-M10.

The external supply voltage VCV feeding the power part varies according to the type of application; in desktop applications (desktop PC) it is of 12V, whereas in mobile applications (laptop PC) it is of 5V.

The power combination, in addition to integrating the control of the two motors (spindle and voice coil motors), includes devices to implement other functions, i.e., voltage regulators and power monitor 4, serial port 5 and ISO-Fet 6.

The ISO-Fet 6 is an internal element of the power combination that serves to insulate the internal supply line Vm from the external supply line VCV if the latter were to fail.

The ISO-Fet 6 power up includes a transistor connected to the voltage VCV and controlled by signal P; said signal P is adapted to shut down the transistor of the ISO-Fet 6 when the voltage VCV is null, whereas it is adapted to keep it on when the voltage VCV is positive.

When the VCV fails, the backelectromotive force voltage of the rotating spindle motor, i.e., the BEMF (Backelectromotive Force), is rectified to keep the internal supply line Vm at a potential enough to supply the section of the voice coil motor 3 for parking the heads.

The rectification of the backelectromotive force of the rotating spindle motor may be carried out by means of one of the following procedures, i.e., a passive rectification, a synchronous rectification of the BEMF of the spindle motor or a step up of the spindle motor.

The passive rectification implies a rectification of the BEMF of the spindle motor through the intrinsic diodes of the power stage 12 which is operated at high impedance.

The synchronous rectification of the BEMF of the spindle motor takes place in an active manner through the sequential power up of two MOSFET transistors of the power stage 12 in synchronicity with the phase of the three backelectromotive forces of the coils L1-L3 of spindle motor 2.

The rectification by means of the spindle motor step up implies that the power stage 12 is continuously switched from a tristate condition to a braking condition at a frequency higher than 20 KHz (out of the audible range), instead of being kept under the tristate condition. Thereby, when the power stage 12 is under the braking condition (with all the low side transistors being switched on or all the high side transistor being switched on), the spindle motor 2 is under a short-circuit condition and therefore the three backelectromotive forces are able to generate a current in the motor. When the power stage 12 is driven in tristate, the three motor currents generated during the braking step recirculate through the intrinsic diodes of the six transistors of power stage 12, thus loading the capacitance C3 connected between the line where there is the voltage Vm and ground GND, keeping it at an enough potential so as to supply the power stage 13 and voice coil motor 3 for parking the reading and writing heads; said parking procedure begins when rectifying the BEMF of the spindle motor 2.

The parking procedure of the reading and writing heads may be commonly carried out either at constant voltage or constant speed.

In the case of constant-voltage parking, the voice coil motor 3 is driven by the stage 13 applying a constant voltage for a certain time period T1, preset with an appropriate polarity for moving the heads in the correct parking direction, or the voice coil motor 3 is driven by the power stage 13 applying a first constant voltage for a time period T1 and a second constant voltage higher than the first voltage for another time period T2.

In the case of constant-speed parking, the voice coil motor is driven so as to keep the speed of reading and writing heads controlled during the parking procedure. Various methods are known in the state of the art to keep under control the speed by which the voice coil motor takes the reading and writing heads to a parked position. This type of procedure ends when the heads reach the parking zone; the control circuit 1 also includes means such as a circuit or device adapted to detect when the reading and writing heads reach the parked position.

Once the reading and writing heads reach the parked position, the spindle motor 2 may be stopped; this generally occurs by short-circuiting the coils of the spindle motor through the activation of the low side transistors or high side transistors of the power stage 12 in a triple half bridge configuration. This procedure is commonly called "dynamic brake". Thereby, with the spindle motor being short-circuited, the BEMF thereof generates a braking current, which is a function of the amplitude of the generated BEMF, and therefore of the instant speed of the motor and the impedance of the motor coils.

In specific applications, such as the hard disks for high end applications, the rotational target speed is very high; the speeds for these applications typically range from 10,000 to 15,000 rpm. To achieve this speed, the impedance of the motor coils is made very low; in such a case, if the motor was placed under a short-circuit condition immediately after the parking procedure of the reading and writing heads, the current generated by the motor itself would have a value even higher than 5 or 6 amps.

In power combinations having the power stage with six transistors, such as the stage 12, such a current value very often exceeds the specification limits for the maximum current that may be driven by the power stage. For such a reason, due to reliability problems, at the end of the parking procedure the spindle motor braking may not be immediately activated through the power up of the low side transistors of the power stage 12, since the high current would damage the power stage 12. It is therefore required to wait for the speed of the spindle motor 2 to become lower than a predetermined speed Vf such that the generated BEMF then forces a lower current to the maximum level that may be controlled by the power stage when the spindle motor is short-circuited to activate its braking. Therefore, in such a case, between the end of the heads parking step and the spindle braking activation there is a waiting time Ta in which it is controlled (by known means) when the speed of the spindle motor 2 becomes lower than the value Vf, so that the short-circuit of the coils thereof may be activated without the BEMF-generated current exceeding the specification limits of the power stage.

This waiting time Ta may also be very long. In fact, spindle motors for high end applications are characterized in that they spin at high speeds and that they have a very high moment of inertia; the waiting time for the speed to decrease from target (e.g., 15,000 rpm) to the speed Vf of activation of motor coil short-circuiting (e.g., lower than 8,000 rpm) is very long (higher than 10 seconds).

BRIEF SUMMARY

In view of the state of the art, the present disclosure provides a method of stopping a spindle motor that reduces the time required to totally slow down the spindle motor once the reading and writing heads have been properly taken to the parked position through the voice coil motor.

In accordance with the present disclosure, a method to stop a spindle motor in the absence of the external supply voltage is provided, said spindle motor being adapted to move a hard disk provided with at least one reading and/or writing head moved by a voice coil motor, said spindle motor being provided with a plurality of coils. The method includes rectifying the backelectromotive force of the spindle motor to produce a braking current, driving the voice coil motor with at least a part of the braking current until the speed of the spindle motor becomes lower than a predetermined stop speed and after parking the at least one reading or writing head of the voice coil motor, stopping the spindle motor by short-circuiting the coils of the spindle motor.

In accordance with the present disclosure, a device to stop a spindle motor is provided. More particularly, the device for stopping the spindle motor in absence of external supply voltage utilizes the spindle motor that is structured to move a hard disc that is provided with at least a reading or writing head moved by a voice coil motor, the spindle motor provided with a plurality of coils, the device including a circuit to rectify the back electromotive force of the spindle motor to produce a braking current and a circuit to stop the spindle motor by short-circuiting the coils of the spindle motor after the speed of the spindle motor has become inferior to a stop speed, and a circuit to drive the voice coil motor with at least a part of the braking current after the at least one reading or writing head is in the parked position and until the speed of the spindle motor becomes lower than the stop speed.

In accordance with another aspect of the present disclosure, an apparatus for piloting of a spindle motor and a voice coil motor to move a hard disc and at least a reading or writing head of the hard disc is provided, the apparatus supplied by an external supply voltage, and the spindle motor provided with a plurality of coils, the apparatus including a circuit to drive the spindle motor and the voice coil motor; a circuit to verify the absence of the external supply voltage; a circuit to rectify the back electromotive force of the spindle motor to produce a braking current in absence of the external supply voltage; a circuit suitable for parking the reading or writing head of the voice coil motor; and a circuit to stop the spindle motor by short-circuiting the coils of the spindle motor after the speed of the spindle motor has become lower than a predetermined stop speed, including a device to stop the spindle motor in the absence of the supply voltage.

In accordance with another aspect of the present disclosure, a circuit is provided that includes a rectifying circuit that rectifies a back voltage from a spindle motor and produces a braking current; a drive circuit coupled to the rectifying circuit and to a voice coil motor to drive the voice coil motor with at least a portion of the braking current until the spindle motor speed of rotation becomes lower than a stop speed of the spindle motor; and a stop circuit coupled to the spindle motor to stop spindle motor rotation when the spindle motor speed of rotation becomes lower than the stop speed.

In accordance with another aspect of the foregoing circuit, the stop circuit includes a plurality of transistors coupled to coils in the spindle motor, the plurality of transistors configured to short circuit the coils in the spindle motor to stop spindle motor rotation.

In accordance with yet a further aspect of the foregoing circuit, a control circuit is coupled to the drive circuit to control the amount of braking current applied to the voice coil motor.

In accordance with yet a further aspect of the foregoing circuit, the drive circuit is structured to supply the braking current to the voice coil motor in a current direction that urges at least one reading or writing head moved by the voice coil motor into a parked position.

In accordance with yet a further aspect of the foregoing circuit, the rectifying circuit includes a plurality of diodes coupled to a plurality of coils in the spindle motor.

In accordance with yet a further aspect of the foregoing circuit, the spindle motor generates the back voltage that is rectified by the rectifying circuit into the braking current, and the voice coil motor is driven with a polarity voltage of the braking current to circulate the braking current in order to force reading or writing heads associated with the voice coil motor towards a parked direction, after which the current returns to brake the spindle motor.

In accordance with yet a further aspect of the foregoing circuit, all of the braking current is used to drive the voice coil motor and park the associated reading or writing head to reduce a wait time for stopping the spindle motor.

In accordance with yet a further aspect of the foregoing circuit, the circuit includes a circuit that controls the amount of voltage applied to the voice coil motor to avoid damage to the voice coil motor.

BRIEF DESCRIPTION OF THE SEVERAL VIEWS OF THE DRAWINGS

The features and advantages of the present disclosure will become apparent from the following detailed description of a practical embodiment thereof, illustrated by way of non limitative example in the accompanying drawings, in which.

DETAILED DESCRIPTION

Figure 1:
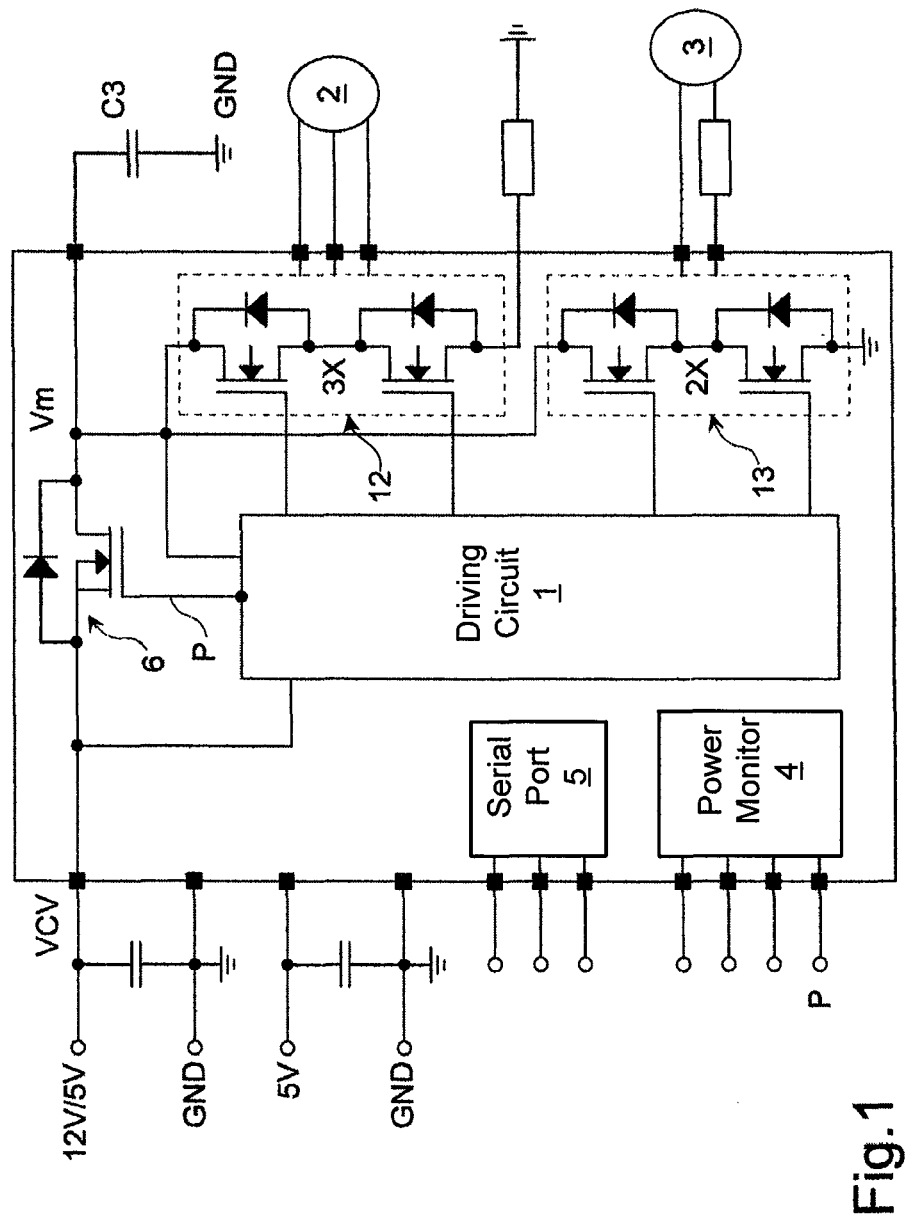
FIG. 1 shows a block diagram of a power combination for a hard disk application.
Figure 2:
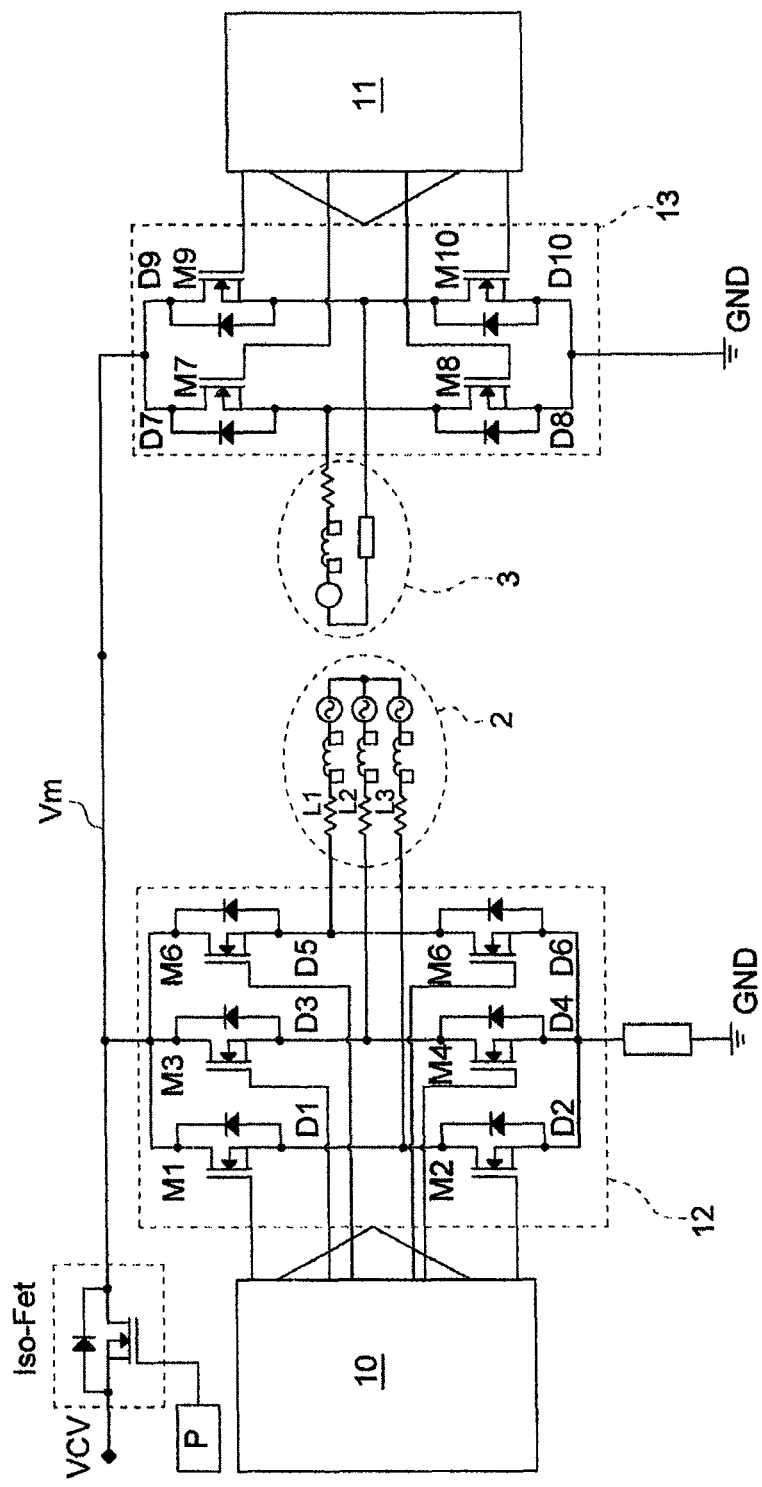
FIG. 2 shows a more detailed diagram of the driving circuit of the spindle motor and voice coil motor of the power combination in FIG. 1.
Figure 3:
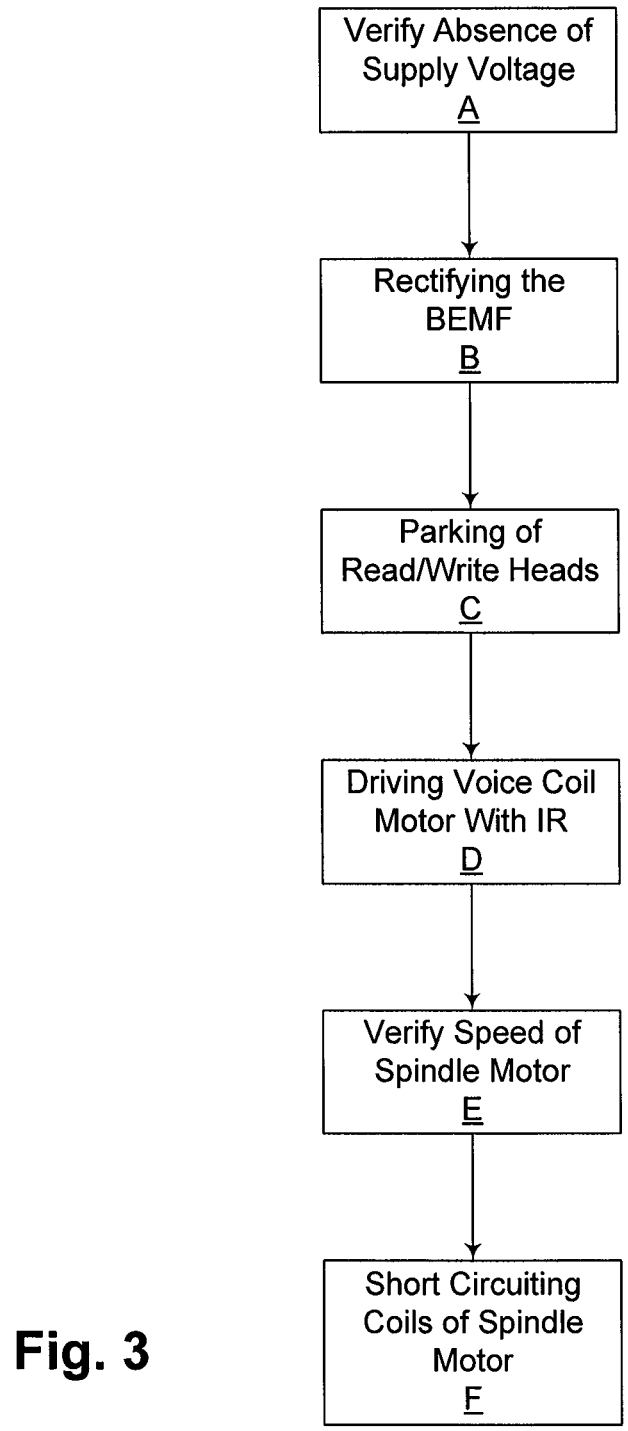
FIG. 3 shows a flowchart of the method to stop a spindle motor in accordance with the present disclosure.

FIG. 3 shows a flowchart of a method to stop a spindle motor in accordance with the present disclosure. The method includes a step D in which the waiting time required to reduce the speed of the spindle motor is reduced by using the voice coil motor 3 as an electric brake, i.e., a step in which the voice coil motor 3 is used as a load for the rectified current generated by the BEMF of the spindle motor 2.

Once the parking step of the reading or writing heads is complete and during the current rectification performed by any known method, the voice coil motor 3 is activated by driving current therein with a direction such that it forces the reading or writing heads toward the parking direction; the reading and writing heads will not be moved any further since they already are in the parked position, but the current that is circulated in the voice coil motor 3 will be a braking current for the spindle motor. This reduces the waiting time Ta because, in the known art, a slowdown in the spindle motor is only due to the inertia of the motor and friction thereof; in accordance with the disclosure, the slowdown of the spindle motor is also due to the presence of the voice coil motor 3 as a load of the rectified current Ir generated by the BEMF of the spindle motor 2.

The braking action will be as high as the current Ir driven in the voice coil motor 3. In other words, the greater the current Ir, the greater the breaking power acting on the spindle motor 2.

Therefore, with the voice coil used as an electric brake, there is a more rapid deceleration of the spindle motor rotation and a consequent considerable reduction in the waiting time Ta before short-circuiting the coils of the spindle motor to completely stop the same under a safe condition for the transistors forming the power stage and controlling the motor.

The method to stop a spindle motor in the absence of the supply voltage VCV in accordance with the present disclosure includes:
rectifying the backelectromotive force, or BEMF, of the spindle motor 2 to produce a braking current at step B,
driving the voice coil motor 3 with the braking current Ir until the speed of the spindle motor 2 becomes lower than a predetermined stop speed Vf and after the parking of the at least one reading and/or writing head of the voice coil motor 3 at steps D and E,
stopping the spindle motor 2 by short-circuiting the coils L1-L3 of the spindle motor 2 at step F.

The method is implemented by a device for stopping a spindle motor in the absence of the supply voltage VCV, where the spindle motor 2 is adapted to move a hard disk provided with at least one reading or writing head moved by a voice coil motor 3. The spindle motor 2 is provided with a plurality of coils L1-L3. The device includes means such as diodes D1-D6 to rectify the backelectromotive force, or BEMF, of the spindle motor 2 to produce a braking current Ir and circuits 10, 12 to stop the spindle motor 2 by short-circuiting the coils L1-L3 of the spindle motor once the speed of the spindle motor 2 has become lower than a predetermined stop speed Vf. The device includes circuits 11, 13 for driving the voice coil motor 3 with the braking current Ir until the speed of the spindle motor 2 becomes lower than the predetermined stop speed Vf and once the at least one reading or writing head is in a parked position.

More generally, the method in accordance with the present disclosure includes the following steps in sequence:
verifying the absence of the supply voltage VCV at step A,
rectifying the BEMF of the spindle motor 2 at step B to produce a braking or stopping current Ir,
parking the reading and writing heads at step C,
once the parking step is complete, driving the voice coil motor 3 with the braking current Ir at step D,
verifying if the speed of the spindle motor 2 is lower than the predetermined stop speed Vf at step E,
stopping the spindle motor 2 by short-circuiting the coils L1-L3 of the spindle motor at step F.

The new step D is interposed between the end of the procedure of parking the writing and reading heads and the control on the speed of the spindle motor before short-circuiting the coils of the spindle motor to totally stop the same.

The action taken at this step D is to enable the power stage which controls the voice coil motor by applying a voltage thereto, which voltage has a polarity such that it forces the reading and writing heads against the parked position.

The amplitude of the voltage applied to the voice coil motor determines the amplitude of the current circulating therein; since this current is supplied by the spindle motor, the amplitude of this current determines the value of resisting torque applied to the spindle motor which slows the speed thereof.

Figure 4:
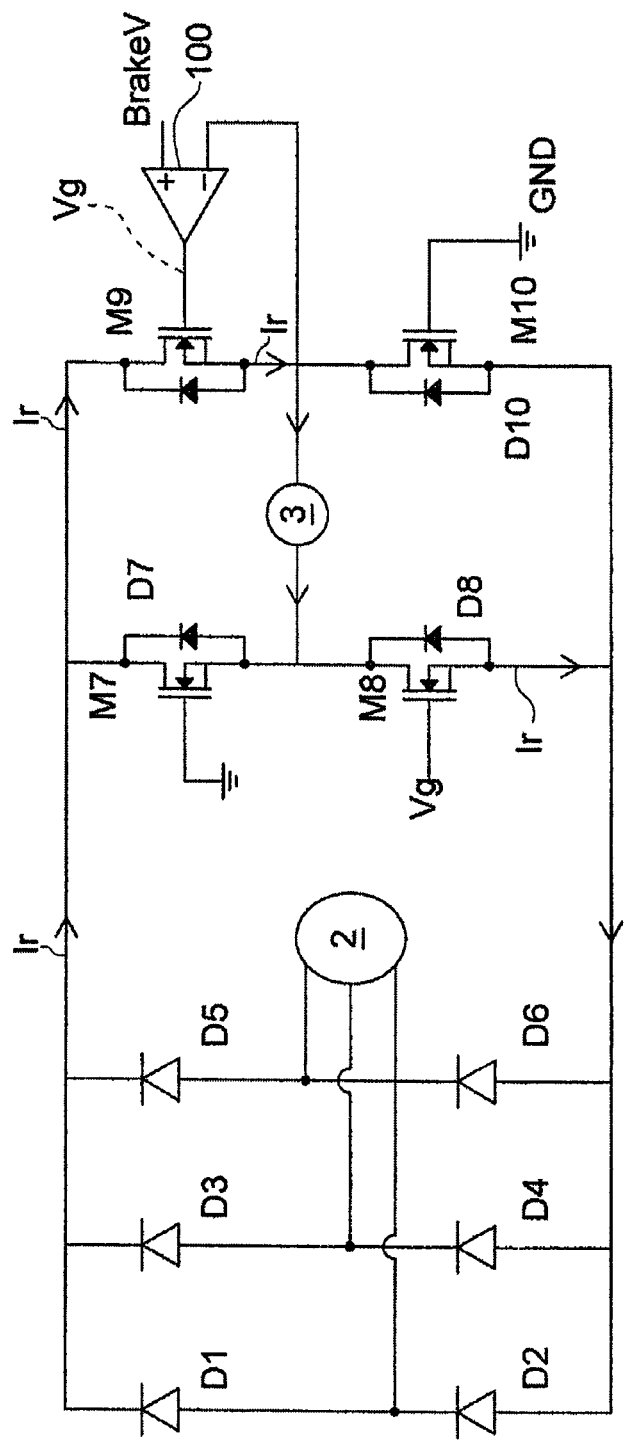
FIG. 4 shows a circuit implementation of the method in accordance with the present disclosure.

A simplified diagram of the control apparatus in which the voice coil motor acts as an electric brake for the electric spindle motor is shown in FIG. 4; spindle motor 2 generates the BEMF which is rectified by means of the diodes D1-D6. Voice coil motor 3 is driven with a polarity voltage so as to circulate a current Ir which forces the reading and/or writing heads towards the parking direction through the transistors M8 and M9. The current Ir thus flows through transistor M9, voice coil motor 3, transistors M8 and returns to the spindle motor 2 by means of diodes D2, D4 and D6.

The transistors M8 and M9 are preferably completely saturated by applying an appropriate voltage Vg to their gate terminals by the circuit 11, so as to allow their complete saturation. In such a case, all the current Ir generated by means of the BEMF of the spindle motor 2 flows on the voice coil motor 3, thus having the maximum reduction of the waiting time Ta.

Alternatively, the braking device may further include a circuit, such as an amplifier 100 for applying a Brake voltage V lower than the voltage Vg to the gate terminal of transistor M9, whereas transistor M8 is completely saturated by applying the voltage Vg to its gate terminal. In such a case, only a part of the current Ir is circulated in the voice coil motor 3 because transistor M9 is not saturated; thereby, the current circulating on the motor is controlled in order to prevent it from having such a high value that would damage the voice coil motor.

The circuit in FIG. 4 is an exemplary implementation with the voltage control of the voice coil motor 3; alternatively, a current control of the voice coil motor may be implemented.

In both cases, the current Ir provided by the spindle motor 2 and circulating in the voice coil motor 3 is a braking current that more rapidly decelerates the speed of spindle motor 2, thus shortening the waiting times Ta before applying the short-circuiting step of the spindle motor 2 to totally stop the motor itself.

The various embodiments described above can be combined to provide further embodiments. All of the U.S. patents, U.S. patent application publications, U.S. patent application, foreign patents, foreign patent application and non-patent publications referred to in this specification and/or listed in the Application Data Sheet are incorporated herein by reference, in their entirety. Aspects of the embodiments can be modified, if necessary to employ concepts of the various patents, application and publications to provide yet further embodiments.

These and other changes can be made to the embodiments in light of the above-detailed description. In general, in the following claims, the terms used should not be construed to limit the claims to the specific embodiments disclosed in the specification and the claims, but should be construed to include all possible embodiments along with the full scope of equivalents to which such claims are entitled. Accordingly, the claims are not limited by the disclosure.

The invention claimed is:

1. A method comprising:
rectifying a backelectromotive force of a spindle motor configured to move a hard disk, the rectifying including producing a braking current from the backelectromotive force;
parking a reading or writing head using a voice coil motor, the parking including driving the voice coil motor with at least a part of the braking current until a speed of the spindle motor becomes lower than a stop speed; and
stopping of the spindle motor by short-circuiting all the plurality of coils of the spindle motor after the parking of the reading or writing head and in response to the speed of the spindle motor becoming lower than the stop speed.

2. The method of claim 1 wherein the driving includes applying to the voice coil motor all the braking current produced by rectifying the backelectromotive force of the spindle motor.

3. The method of claim 1 wherein the driving includes controlling a quantity of the braking current produced by rectifying the backelectromotive force of the spindle motor.

4. The method of claim 1 wherein driving the voice coil motor includes driving the voice coil motor with the braking current having a current direction that urges the reading or writing head towards a parked position.

5. A device, comprising:
a hard disk;
a reading or writing head configured to perform at least one of reading from and writing to the hard disk;
a voice coil motor structured to move the reading or writing head into a parked position;
a spindle motor structured to move the hard disk, the spindle motor having a plurality of coils configured to produce a backeletromotive force;
a rectifier circuit configured to rectify the backelectromotive force of the spindle motor to produce a braking current;
a driving circuit configured to drive the voice coil motor with at least a part of the braking current after the reading or writing head is in the parked position and until a speed of the spindle motor becomes lower than a stop speed; and
a control circuit configured to stop the spindle motor by short-circuiting the coils of the spindle motor after the speed of the spindle motor has become lower than the stop speed and after the reading or writing head is in the parked position.

6. The device of claim 5 wherein the driving circuit comprises a device to control the quantity of braking current to furnish to the voice coil motor.

7. The device of claim 5 wherein the driving circuit is structured to temporarily furnish all of the braking current to the voice coil motor.

8. A system, comprising:
a hard disk;
at least one reading or writing head configured to perform at least one of reading from and writing to the hard disk;
a voice coil motor structured to move the at least one reading or writing head into a parked position;
a spindle motor configured to move the hard disk and having a plurality of coils configured to produce a backelectromotive force; and
an apparatus configured to be supplied by an external supply voltage and configured to control the spindle motor, the apparatus including:
a driving circuit configured to drive the spindle motor and the voice coil motor with a braking current;
a verification circuit configured to verify an absence of the external supply voltage;
a rectification circuit configured to rectify the backelectromotive force of the spindle motor to produce the braking current in absence of the external supply voltage;
a parking circuit coupled to the voice coil motor and configured to control parking of the at least one reading or writing head; and
a stopping circuit configured to stop the spindle motor by short-circuiting all the coils of the spindle motor after the speed of the spindle motor has become lower than a stop speed and after the parking of the at least one reading or writing head.

9. The system of claim 8 wherein the driving circuit comprises a braking current control circuit configured to control the quantity of braking current to furnish to the voice coil motor.

10. The system of claim 9 wherein the driving circuit is configured to temporarily furnish all of the braking current to the voice coil motor.

11. A circuit, comprising:
a rectifying circuit configured to rectify a back voltage from a hard drive spindle motor and to produce a braking current;
a drive circuit coupled to the rectifying circuit and to a voice coil motor and configured to drive the voice coil motor with at least a portion of the braking current to park a reading or writing head of the hard drive; and
a stop circuit coupled to the spindle motor and configured to stop rotation of the spindle motor by short-circuiting all coils in the spindle motor after the drive circuit parks the reading or writing head and after a speed of rotation of the spindle motor becomes lower than a stop speed.

12. The circuit of claim 11 wherein the stop circuit comprises a plurality of transistors coupled to the coils in the spindle motor, the plurality of transistors configured to short circuit the coils in the spindle motor to stop spindle motor rotation.

13. The circuit of claim 11, comprising a braking current control circuit coupled to the drive circuit to control the amount of braking current applied to the voice coil motor.

14. The circuit of claim 11 wherein the drive circuit is structured to supply the braking current to the voice coil motor in a current direction that urges the reading or writing head into the parked position.

15. The circuit of claim 11 wherein the rectifying circuit comprises a plurality of diodes coupled to respective coils in the spindle motor.

16. The circuit of claim 15, comprising a voltage control circuit that is configured to control the amount of voltage applied to the voice coil motor to avoid damage to the voice coil motor.

17. The circuit of claim 11 wherein the spindle motor is configured to generate the back voltage that is rectified by the rectifying circuit into the braking current, and the voice coil motor is configured to be driven with a polarity voltage of the braking current to circulate the braking current in order to force the reading or writing head towards a parked direction, after which the braking current is used to brake the spindle motor.

18. The circuit of claim 11 wherein all of the braking current is used to drive the voice coil motor and park the associated reading or writing head to reduce a wait time for stopping the spindle motor.

* * * * *